United States Patent
Kadau et al.

(10) Patent No.: US 9,857,242 B2
(45) Date of Patent: Jan. 2, 2018

(54) METHOD FOR ANALYSIS OF 3D FEATURES USING A 2D PROBABILISTIC ANALYSIS

(71) Applicant: Siemens Energy, Inc., Orlando, FL (US)

(72) Inventors: Kai Kadau, Lake Wylie, SC (US); Christopher W. Ross, Oviedo, FL (US); Chirag B. Patel, Charlotte, NC (US); Christian Amann, Bottrop (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 624 days.

(21) Appl. No.: 14/314,159

(22) Filed: Jun. 25, 2014

(65) Prior Publication Data

US 2015/0377766 A1 Dec. 31, 2015

(51) Int. Cl.
| | |
|---|---|
| *G01L 1/00* | (2006.01) |
| *G06F 17/50* | (2006.01) |
| *G06N 7/00* | (2006.01) |
| *G05B 23/02* | (2006.01) |
| *G05B 19/4065* | (2006.01) |

(52) U.S. Cl.
CPC ............ *G01L 1/00* (2013.01); *G06F 17/5018* (2013.01); *G05B 19/4065* (2013.01); *G05B 23/0283* (2013.01); *G06F 17/5009* (2013.01); *G06F 2217/10* (2013.01); *G06N 7/005* (2013.01)

(58) Field of Classification Search
USPC ........................................................ 702/35
See application file for complete search history.

(56) References Cited

U.S. PATENT DOCUMENTS

| | | | |
|---|---|---|---|
| 6,301,970 B1 | 10/2001 | Bigg et al. | |
| 2012/0078599 A1* | 3/2012 | Tryon, III | ............ G06F 17/5018 703/7 |
| 2014/0107948 A1 | 4/2014 | Amann et al. | |

OTHER PUBLICATIONS

Massachusetts Institute of Technoldoy Department of Mechnical Engineering; 2.002 Mechanics and Materials II; Spring 2004; Laboratory Module No. 4; Isotropic Linear Elastic Stress Concentration; p. 1-20.*

Fredrik Forsberg, "Probabilistic Assessment of Failure Risk in Gas Turbine Discs", Degree Project LIU-IEI-TEK-A—08/00496—SE, Linkoping University, Institute of Technology.

P. Kantzos, et al., "Effect of Powder Cleanliness on the Fatigue Behavior of Powder Metallurgy Ni-Disk Alloy Udimet 720", Superalloys 2004, The Minerals, Metals & Materials Society, pp. 409-417, (Tenth International Symposium), 2004.

R. Craig McClung, et al., "Integration of NASA-Developed Lifting Technology for PM Alloys into DARWIN", NASA/CR-2011-216977, Mar. 2011.

(Continued)

*Primary Examiner* — Gregory J Toatley
*Assistant Examiner* — Terence Stifter, Jr.

(57) ABSTRACT

A method for analyzing a three-dimensional stress concentrating feature of a component (60), such as a borehole (62), using a two-dimensional probabilistic technique. A circumferentially-dependent stress concentration profile around the stress concentrating feature is determined, and then a probability of failure of the component is calculated using a 2D probabilistic failure analysis of the stress concentration profile. The probabilistic failure analysis may include a Monte Carlo theta integration approach.

16 Claims, 4 Drawing Sheets

(56) References Cited

OTHER PUBLICATIONS

M. Nakayama et al., "Failure Probability of Pin Joint in CFRP Laminate," In: The 18th International Conference on Composite Materials, Aug. 21-26, 2011, (http://www.iccm-central.org/Proceedings/ICCM18proceedings/iccm.htm) see sections 2.3-2.6.

E.V. Iarve et al., "Three-dimensional stress analysis and Weibull statistics based strength prediction in open hole composites,"Composites: Part A, vol. 38, No. 1, pp. 174-185, Jan. 2007 (http://www.sciencedirect.com/science/article/pii/S1359835X06000194) See pp. 174 and 184.

* cited by examiner

METHOD FOR ANALYSIS OF 3D FEATURES USING A 2D PROBABILISTIC ANALYSIS

FIELD OF THE INVENTION

The present invention relates to a method and system for analyzing three dimensional component features using a two-dimensional probabilistic analysis. In particular the analysis relates to fatigue failures in a component feature, especially a component subjected to cyclic stresses. According to the invention, the three dimensional probabilistic analysis is mapped, for example using Monte-Carlo methods, to a more practical two-dimensional analysis. The invention therefore allows assessment of a three dimensional feature of a component in an effective two dimensional analysis.

BACKGROUND OF THE INVENTION

During operation, many systems and their constituent components are subjected to both mechanical and thermal stresses. Individual components, for example, can be subjected to direct mechanical stresses through the application of compressive or tensile forces. Thermal stresses occur due to temperature changes directly within the component or in the environment in which the component operates. Such stresses may be constant or vary as a function of time. The components in a gas turbine are subjected to such cyclic mechanical and thermal stresses, especially when the gas turbine is started or shut down.

Extreme cyclic loading, both mechanical and thermal, results in material fatigue, which, in many cases limits the life of one or more components exposed to the loading. Fatigue crack growth (FCG) under cyclic loading conditions is often the life-limiting mechanism for a component. Small cracks can nucleate from inherent material flaws, such as a preexisting flaw in a forging or from another crack-initiation mechanism, such as low-cycle fatigue (LCF).

Cyclic loading, for example the starting and shutting down of an engine or another significant change in its operating condition, may cause small cracks in a component to grow incrementally without directly and immediately impacting the structural integrity of the component. This phenomenon is referred to as stable crack growth. But when the crack reaches a critical size, its growth becomes unstable (i.e., growth in an uncontrolled manner). The unstable crack grows quickly and significantly, resulting in possible component failure.

The number of cycles N at which unstable crack growth begins is called the fatigue crack life of the component. The crack growth rate, which affects the value of N, can be estimated using linear elastic fracture mechanics (LEFM) and finite element analyses (FEA) for estimating a transient stress field to which the component is subjected.

Due to the uncertainties associated with material properties and initial flaw size and the complexities of the LEFM and FEA analyses, estimating a lifetime of a component is a difficult and tedious process. Therefore, the design of some components may not consider fatigue crack growth or the design may be extremely conservative relative to fatigue crack growth. As a result of this conservative approach, the component may be designed with conservative features (material, dimensions, tolerances, etc.), its operating conditions may be limited (minimum starting metal temperatures, etc.), or it may be prematurely serviced or taken out of service, i.e., when a more accurate analysis may permit a longer service interval. Such premature service intervals or component replacements may add significantly to system cost.

Fatigue crack life calculations can be made according to a deterministic or a probabilistic approach.

The deterministic approach uses minimum (or maximum, as appropriate) material properties to estimate a component service life. Conservative estimates of material properties and initial flaw sizes are used, as well as worst-case scenarios and significant safety factors. For instance, a gas turbine includes, according to one design, about twenty rotor disks (also referred to as compressor disks or turbine disks) stacked horizontally end-to-end to form a gas turbine rotor. See FIG. 1 and the discussion of FIG. 1 below. The deterministic approach may yield a fatigue crack life of N=3000 engine starts. This result is based on minimum material properties and maximum assumed flaw size at the worst possible location (largest stress range) on the component, e.g., the rotor disk. Using worst case assumptions, the fatigue crack life N can be conservatively estimated by LEFM or known extensions of that technique. This approach falls under the so-called safe-life design philosophy and has been used for land-based heavy duty gas and steam turbines.

The drawback of such deterministic fracture mechanics calculations is that the analysis of a component is based on a single location or a few locations and on minimum/maximum material properties at those locations. The distribution of the material properties and flaw sizes throughout the component is not used in the deterministic approach. The safety-factor, which is inherent in the deterministic approach, may thereby lead to an overly conservative design.

The second approach to determining component life involves probabilistic methods and statistics to study the influence of thermal and mechanical stress variations on a component. In particular, a probabilistic analysis may utilize fracture mechanics calculations based on flaw-size distributions and component inspection intervals. The probabilistic approach may permit the design of lower cost components with expanded operating conditions and/or longer service lifetime than permitted by the deterministic approach.

Advantages and disadvantages of the probabilistic and deterministic approaches have been discussed at length in the pertinent literature. Both approaches can be used to conduct failure analyses of a gas or combustion turbine and its constituent components, in particular its rotating turbine disks. A gas or combustion turbine is a type of internal combustion engine. An air stream is compressed and accelerated within a compressor. Fuel is injected into the air stream in a combustor or combustion chamber where ignition of the fuel occurs. Ignition of the fuel creates a hot combustion gas flow that is directed to a turbine and causes it to rotate. The combustion gas stream (also referred to as a working gas) expands as it enters the turbine, which includes rows of stationary guide vanes and rotating blades connected to a turbine shaft. The expanding gas flow is accelerated by the guide vanes and directed over the rotating blades, causing the blades and thus the turbine shaft to spin. The spinning shaft turns the compressor and also provides a mechanical torque output. After passing through the turbine disks, the working gas flow enters a turbine exhaust casing.

FIG. 1 depicts a prior art gas or combustion turbine 10, generally including a compressor 12, a combustion chamber 14 and a turbine 16. The compressor 12 inducts and compresses ambient air. The compressed air then enters one or more combustors 28 in the combustion chamber 14, where the compressed air is mixed with fuel. The air-fuel mixture ignites to form a hot working gas. The working gas is directed to the turbine 16 where it expands through alternating rows of stationary guide vanes 22 and rotating blades 18 to generate mechanical forces that turn a shaft, which is not specifically shown in FIG. 1. The expanded gas exits the turbine 16 via an exhaust casing (not shown). The rotating blades 18 are attached to rotor disks 40 that are in turn affixed to the turbine shaft.

In a probabilistic analysis of gas turbine rotor disks, variations in material properties, flaw size and location distribution are used to determine a probability of failure, PoF(N), after N operational cycles. A typical probability-of-failure value for a gas turbine rotor disk after N=3000 starts is on the order of:

$$PoF(3000) \sim 1/1,000,000$$

This result indicates that after about 3000 starts, 1 of 1,000,000 rotor disks will have failed.

Another important metric for component life is the hazard H(N) or the risk per start, which for low PoF(N) values is a derivative dPoF(N)/dN.

Other types of probabilistic analyses, such as probabilistic low cycle fatigue (LCF) analysis, are of interest as well.

To date, a few publicly known probabilistic tools have been developed for use in only two-dimensional analyses as probabilistic analysis is still in its infancy. For example, the well-known DARWIN code can be used only for 2-dimensional axially-symmetric components and is geared towards aero (e.g., aeronautic and aerospace) engine design. This code employs a zone based approach that spatially decomposes the components into a number of zones. A theoretical crack is positioned within each zone for representing the crack growth for the entire component.

In contrast to the DARWIN code, the ProbFM code, which is described in a commonly-owned patent application entitled Method and System for Probabilistic Fatigue Crack Life Estimation (Publication No. US 2014/0107948 A1, application Ser. No. 13/652,671) is a direct simulation Monte-Carlo approach that uses high-performance computing techniques to perform billions of fracture mechanics simulations, positioning cracks everywhere in the component. The corresponding crack growth path is assumed according to the calculated stress field (i.e. according to the first principal stress field). No manual positioning of cracks or other manual processes are needed. The evaluations can be replicated easily by different design engineers using the ProbFM code. Publication No. US 2014/0107948 A1 is incorporated by reference herein in its entirety. To date both codes DARWIN and ProbFM work properly only in two-dimensions.

In the area of probabilistic fracture mechanics, the extension from two-dimensional techniques to three-dimensional techniques is very involved and no techniques are known. A gas turbine rotor disk can be analyzed by the aforementioned DARWIN program only by analyzing the axis-symmetric two-dimensional problems, or by the ProbFM code, but again only in two dimensions.

BRIEF DESCRIPTION OF THE DRAWINGS

The invention is explained in the following description in view of the drawings that show.

DETAILED DESCRIPTION OF THE INVENTION

There are no known techniques employing probabilistic fracture mechanics (PFM) techniques for a three-dimensional component feature, such as a borehole (e.g., a bolt hole or a cooling hole) in a component or part. Gas turbines and steam turbines include rotor disks that each may include several such boreholes. These three-dimensional features typically cause concentrations of the local stress field resulting in local regions of minimum fatigue life. It would therefore be advantageous to develop a solution for analyzing the fracture characteristics of these boreholes and other three dimensional structures.

The present invention extends the concepts presented in the above cited patent application Publication No. US 2014/0107948 A1 entitled Method and System for Probabilistic Fatigue Crack Life Estimation by considering three dimensional components and three dimensional features of a component and analyzing those three dimensional components and features using, for example, the methods and systems of that publication.

The present invention teaches mapping a three-dimensional stress field distribution (as that stress field is applied to a three-dimensional component or a three dimensional feature of a component) onto a two-dimensional stress field. Hence, the present invention describes methods and systems for the probabilistic analysis of a three-dimensional component (or a feature of such a component) using a more practical and conventional two-dimensional probabilistic analysis. In particular, the concepts embodied in the present invention can be applied to components and parts that have boreholes, for example, and to other three-dimensional features and components.

Various inventive embodiments utilize a series of two-dimensional (2D) calculations to determine PoF(N) values for a component with a three-dimensional (3D) feature such as a borehole. The resulting more accurate PoF(N) values, when compared with the values attained strictly from a two-dimensional analysis, are valuable for assessing component lifetime (and therefore component replacement intervals) and for evaluating new component designs.

In a two-dimensional axis-symmetric finite element analysis (FEA) of the prior art, the boreholes are treated as plain strain elements having a finite thickness and adjusted modulus. This approach takes into consideration material between adjacent boreholes, but does not account for any stress increases between boreholes and in the vicinity of the boreholes.

Figure 1:
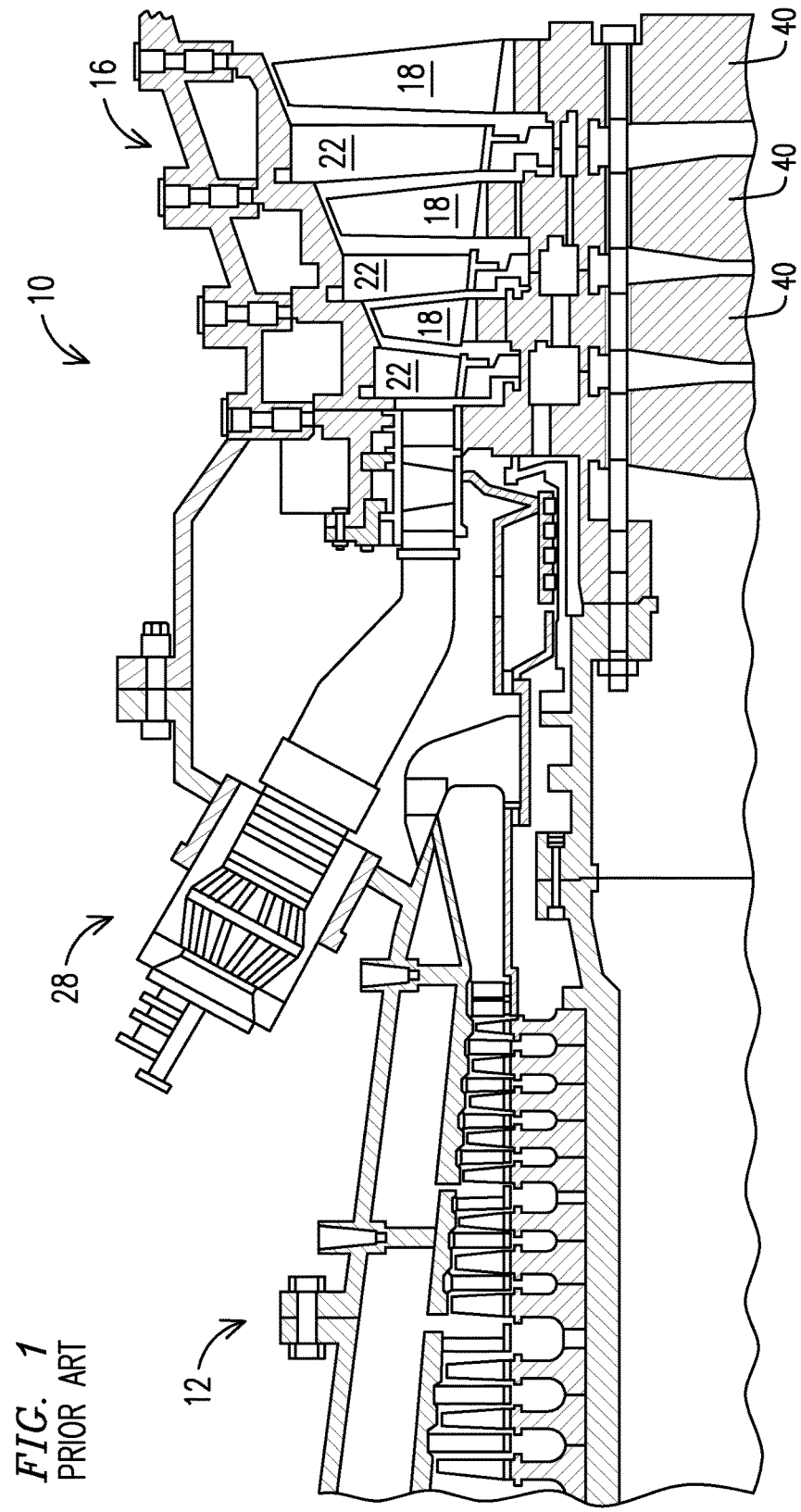
FIG. 1 is a partial cross-sectional view of a prior art gas turbine.
Figure 2:
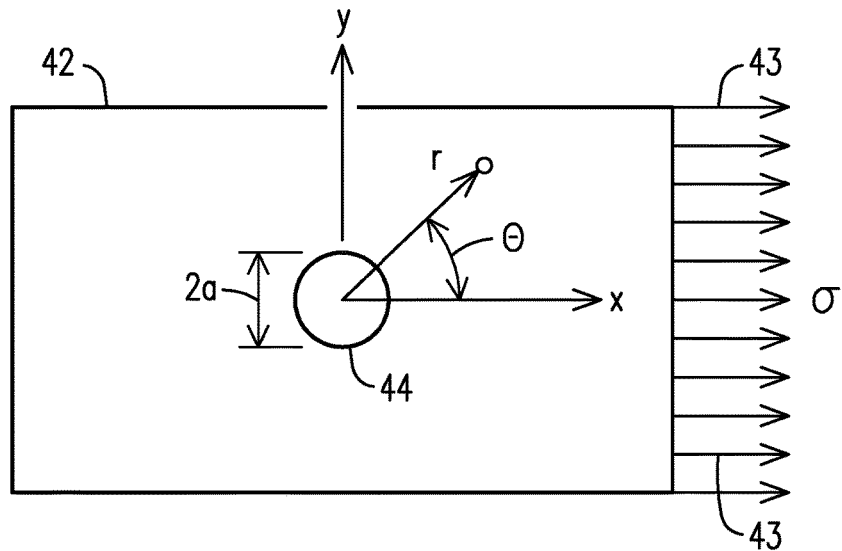
FIG. 2 is a diagram illustrating various parameters used in equations associated with the present invention.

For cooling holes, the thermal effects of convective heat transfer by the cooling air as it flows through the cooling holes can be included in the transient and steady-state temperature analyses. However, in the prior art the increased stress due to stress concentration near the borehole is accounted for only in a very conservative manner by assuming there is no circumferential stress increase dependence. The prior art approach assumes instead the most critical stress increase in the two-dimensional plane (at θ=90 as illustrated in FIG. 2 and discussed below).

These stresses can be caused by thermal effects or by mechanical forces imposed on the component with the cooling hole. In a gas turbine, considerable mechanical forces are caused by the centrifugal forces generated during rotation of the turbine disk.

The present invention considers these stress concentrations to produce a more accurate probability of failure analysis or a component lifetime analysis. This feature is important as the life-limiting location for many components is often near boreholes and similar features that concentrate stresses.

The present invention expands on the 2D axis-symmetric model by removing material from the component at the location of the borehole and determining a circumferentially-dependent stress increase profile. The stress profile with its circumferential dependence can then be analyzed by using a multiple two-dimensional probabilistic analyses or by using a Monte Carlo theta integration analysis.

By including this three-dimensional stress dependence near a borehole (or another 3D feature) the probabilistic analysis is clearly more accurate and less conservative than assuming the worst case scenario as in the prior art.

For example, in the prior art deterministic analysis the stresses at the borehole are increased by a factor of three, which corresponds approximately to the stress at θ=90 (see FIG. 2). However, as will be described below, at other angles the stress is less than the stress value at θ=90 and thus the prior art deterministic approach yields an overly conservative result.

FIG. 2 illustrates an ideal infinitely-sized plate 42 defining a borehole 44 with a radius "a" under a uni-axial stress a applied as shown. The parameters illustrated in FIG. 2 are used in equations (1) and (2) below. In practice any simple rectangular component can be represented by an infinitely-sized plate.

To capture the increased stress near the borehole, which is not accounted for in the 2D axis-symmetric calculation, a stress concentration factor is applied according to equation (1) below.

$$\sigma_\theta = \frac{\sigma}{2}\left[1 + \left(\frac{a}{r}\right)^2 - \left(1 + 3\left(\frac{a}{r}\right)^4\right)\cos 2\theta\right] \quad (1)$$

In equation (1), σ is the stress value according to the 2D axis-symmetric model, $\sigma_\theta$ is the increased stress at a distance r from the borehole, a is a borehole diameter, and θ is an angle measured from the x axis. FIG. 2 depicts these parameters and also depicts stress vectors 43 representing the stress σ.

Given the cos 2θ factor in equation (1) and the negative sign, the maximum stress concentration factor is at θ=90°, i.e. tangential to the borehole 44.

Other known equations can be used in lieu of equation (1) to determine a stress concentration factor. Note that equation (1) applies to an infinitely-sized plate with a hole.

Figure 3:
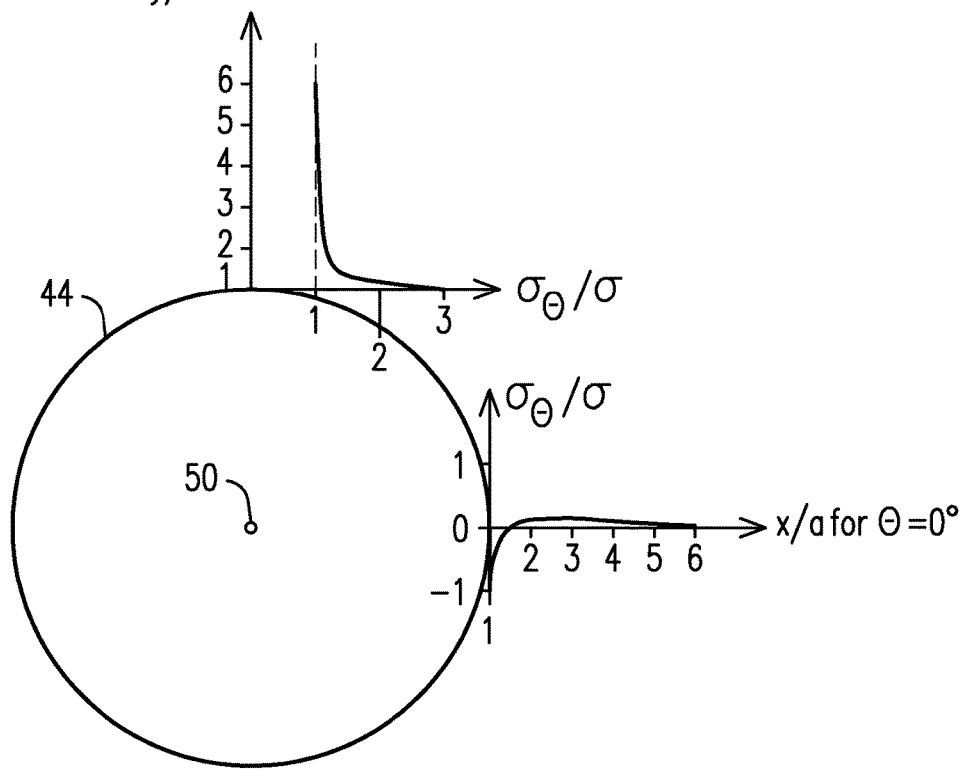
FIG. 3 is a diagram illustrating a stress variation ratio $\sigma_\theta/\sigma$, where $\sigma_\theta$ is a stress component at a circumferential angle $\theta$ relative to a borehole and $\sigma$ is a stress component absent the borehole for two different circumferential angles $\theta=0$ and $\theta=90$ as $\theta$ is defined in FIG. 2.

FIG. 3 depicts a ratio of the stress concentration factor $\sigma_\theta$ and the stress value σ as a function of the distance from the center of the borehole 44 for two angles θ=0° and θ=90°. As can be seen, for θ=90°, which yields the highest stress concentration profile, from a distance of about 3 to 6 radii from a center 50 of the borehole 44, the stress concentration factor $\sigma_\theta$ is approximately equal to the stress a, that is the ratio of $\sigma_\theta/\sigma$ is about 1. The stress concentration factor then increases rapidly to about three times the stress value at a distance of about 1 radii.

For θ=0°, which yields the lowest stress concentration factor profile, at the borehole perimeter (where x/a=1) the ratio of $\sigma_\theta/\sigma$ is −1, which means that the vector representing the stress concentration factor points in the opposite direction from the illustrated stress vectors 40. But the values of $\sigma_\theta$ and σ are about numerically equal. For values of x/a>1 the ratio of $\sigma_\theta$ to σ is about 0, which means the stress concentration factor at θ=0° is about zero, i.e. the stress vanishes because it has concentrated at other circumferential locations.

For other points around the circumference of the borehole 44, at θ=180° the ratios of the stress concentration factor $\sigma_\theta$ and the stress value σ are the same as at θ=0°. Similarly at θ=270° the ratios of the stress concentration factor $\sigma_\theta$ and the stress value σ are the same as at θ=90°. Thus the illustrated variation between 0° and 90° provides all the information required to characterize the variation around the complete circumference of the borehole 44.

From both equation (1) and FIG. 3 it can be seen that the maximum stress concentration factor profile is present at θ=90. Equation (1) then reduces to equation (2) below for θ=90.

$$\sigma_{90} = \sigma\left[1 + \frac{1}{2}\left(\frac{a}{r}\right)^2 + \frac{3}{2}\left(\frac{a}{r}\right)^4\right] \quad (2)$$

As mentioned above, to be conservative, this maximum stress concentration value can be used for all values of θ.

In another embodiment multiple probabilistic analyses are performed with different angular values of θ and the results are averaged to obtain a single probability of failure value for the component.

If a fully three-dimensional model of the component, or a section thereof including the three dimensional feature, is available, more accurate stress concentration factor profiles can be used in lieu of the value given by equations (1) and (2). It should be pointed out that the present invention is not directed to an FEA analysis, but instead to a method to circumvent a three-dimensional probabilistic analysis. In the case of probabilistic fracture mechanics, such a three-dimensional calculation has not yet been performed in its entirety.

Figures 4, 5, 6:
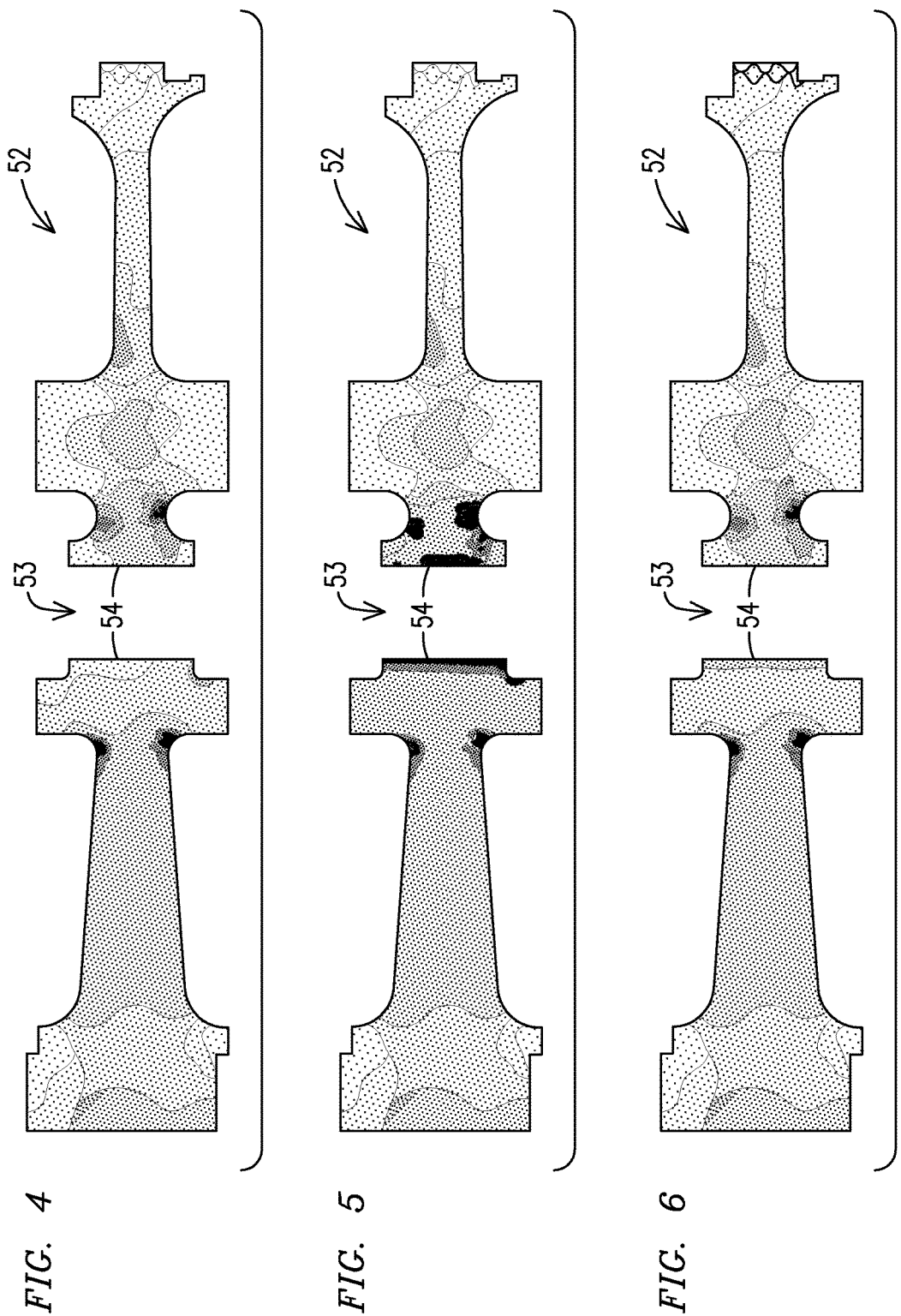
FIGS. 4 and 5 are cross-sectional images illustrating stress fields, at two different circumferential angles, of a borehole defined within a component.
FIG. 6 is a cross-sectional image illustrating stress fields for a Monte Carlo theta integration approach of one embodiment of the present invention.

FIGS. 4 and 5 are cross-sectional illustrations of stress fields of a component 52 with a borehole 53 (e.g., bolt hole). The illustrated stress field was calculated according to the present invention and is shown at θ=0° in FIG. 4 and θ=90° in FIG. 5.

In FIG. 4 no additional stress forces are depicted in region 54, which is a radial slice through the bore hole 53 (and through the component 52) at θ=0°.

But in FIG. 5 additional stress forces are indicated in the region 54. The FIG. 5 image is of a cross sectional plane through the component 52 and the borehole 53 at θ=90°.

FIG. 6 is another cross sectional image created using the Monte Carlo theta integration embodiment described below, where the stress increase in the region 54 is uniformly distributed between θ=0° to 360°.

The stress fields of FIGS. 4-6 have been generated according to the embodiments of the invention and can be used for a two-dimensional probabilistic analysis as described elsewhere herein.

To determine the PoF(N) value, the system described in the above cited application Publication No. US 2014/0107948 A1 inputs a modified two dimensional stress distribution as explained above.

The inventors have developed two different approaches for two-dimensional probabilistic failure analysis of boreholes: (1) a sum of multiple angular sectors two-dimensional approach and (2) a less conservative Monte-Carlo theta integration approach (MCTIA). Although the two approaches are described for a specific case of probabilistic fracture mechanics as applied to a two-dimensional axis symmetric rotor disk, the described methodologies can be applied to other components, such as sections of turbine blades or vanes, turbine blade/vane transitions and their cooling channels. The teachings can also be applied to different failure mechanisms, such as Low Cycle Fatigue (LCF) crack initiation.

The first approach using a sum of multiple angular sectors may be approached differently in two embodiments. A very conservative embodiment applies the worst case circumferential stress concentration factor (i.e., the stress increase from equation 2) over the entire circumference (i.e., over the entire θ range from 0 to 360 degrees). A more realistic embodiment (i.e., less conservative) of this first approach provides more realistic results. Here the individual stress concentration values are determined for each one of multiple sectors (e.g. pie-shaped sectors) that together represent the complete circular borehole. The sectors are denoted i=1 ... n each extending over an angular arc of the borehole and the angle of such sectors is 360/n. According to this latter approach and using equation (1) a discrete stress concentration value is obtained for a given angle and that value is applied for all angles within an angular sector about that angle. For example, for n=18 each sector circumscribes a 20° sector. Equation (1) is used to calculate the stress concentration profile value at θ=10° and that value applied to all 0 values between 0° and 20°, i.e., that calculated value is used for the entire pie-shaped sector from 0° to 20°. Another value is calculated from equation (1) for θ=30° and that value used for all angular values between θ=20° and θ=40°. Thus one stress concentration value is calculated for one angle within a sector and applied to all angles within that sector.

The total risk R (or probability of failure PoF) can then be expressed as a function of the sum of the individually calculated risks $R_i$ each representing a circumferential sector of the borehole.

$$R = \frac{1}{n}\sum_{i=1}^{n} R_i \quad (3)$$

According to one embodiment each individual risk $R_i$ can be a conservative description or at least representative of the sector it represents. That is, the value $R_i$ can be set to the most conservative value calculated within each sector i. The resulting total risk reduces and converges with increasing n to a limiting risk number as the resolution is made finer and finer. Each individual calculation to quantify Ri is obtained by modifying the stress field and performing a subsequent calculation as described in patent application Publication No. US 2014/0107948 A1.

Note that to maintain conservatism according to this approach (or the Monte Carlo theta integration approach described below), the value PoF(N) may not consider stress reductions below the original stress value of a (i.e. θ=0° in FIG. 3). But in another embodiment these stress reduction values are taken into account.

The above described approach requires multiple PoF(n) evaluations to calculate the risk R for a component that includes a borehole. To perform this more effectively and faster, a Monte-Carlo theta integration approach (MCTIA) has been developed as another embodiment, where the stress field proximate the borehole is increased by randomly selecting a circumferential location θ.

Generally a Monte Carlo method includes defining a domain of possible inputs that have a given probability distribution (a uniform distribution, for example) over a domain, randomly select values from that domain, perform a deterministic computation on those inputs, and aggregate the results. Those basic principles are employed in this second approach of the present invention.

In this MCTIA embodiment in the pre-processing steps of the PoF(n) procedure, the stress field around a borehole is increased based on a randomly chosen circumferential position θ at each component position represented in PoF(n) by a voxel (volume pixel element). The increase at each location is based on a Monte-Carlo determined circumferential position θ and the associated stress increase according to equation (1) above. Additionally, correction factors from the FEA analysis can also be applied, if available, as described above. In practice, those FEA correction factors lead in general to a stress reduction as compared to the stress values determined from equation (1), and therefore result in a less conservative result.

Figure 7:
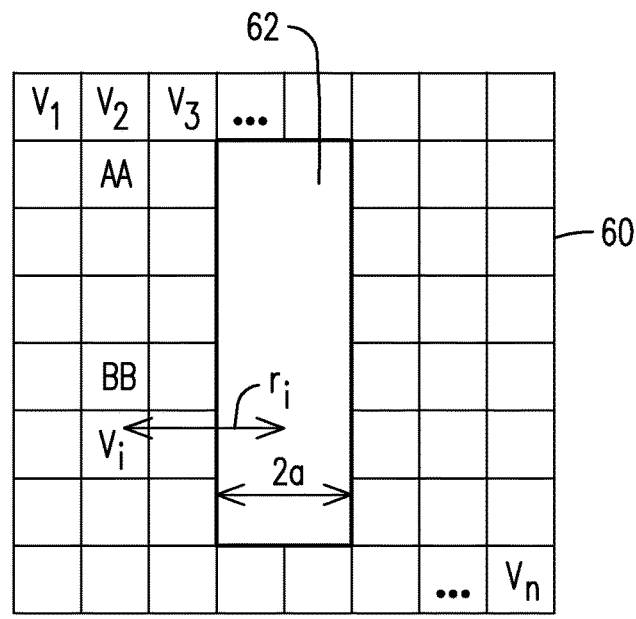
FIG. 7 illustrates a borehole in a component and voxel elements proximate thereto.

The MCTIA approach is illustrated in FIG. 7. In the value PoF(n) a component 60 is represented by a plurality of voxels (volume pixel elements) $V_i$ for i=1, 2, ... n. The stress increase for each voxel near a borehole 62 is determined by a uniformly distributed random variable angle θi=U (0,360).

The relevant equation is similar to equation (1) above.

$$\sigma_i = \frac{\sigma}{2}\left[1 + \left(\frac{a}{r}\right)^2 - \left(1 + 3\left(\frac{a}{r}\right)^4\right)\cos 2\theta_i\right] \quad (4)$$

where $\theta_i = U(0,360)$

Where σ is the stress value according to the 2D axis-symmetric model, $\sigma_i$ is the increased stress at a distance r from the borehole, a is a borehole diameter, and θ is an angle measured from the x axis.

This technique results in a fine granularity for the resulting stress field and assumes that the component's voxel resolution is fine enough to capture both the circumferential stress variation and the conventional spatial variation. See FIG. 6.

The described MCTIA approach changes the stress field once in a pre-processing step and after that step regular probabilistic analysis can be performed on the resultant stress field. This embodiment is therefore very efficient and does not require any changes in the underlying probabilistic analysis method or code.

According to another embodiment, each voxel is assigned a random variable θ. Each time the stress values for that voxel are determined for performing the probabilistic analysis, a stress field value increase according to equation (1) above is calculated, where θ is equally distributed over the range 0 to 360 degrees.

The latter embodiment simply changes the order of the two operations: stress field look-up and stress field increase. This approach may be beneficial in a situation where a component is represented with a low resolution of points.

To validate the inventive MCTIA approach, the inventors compared the MCTIA result to the results based on equation (3) above where the 3D borehole is represented by N central two dimensional slices (i.e., the first approach).

Figure 8:
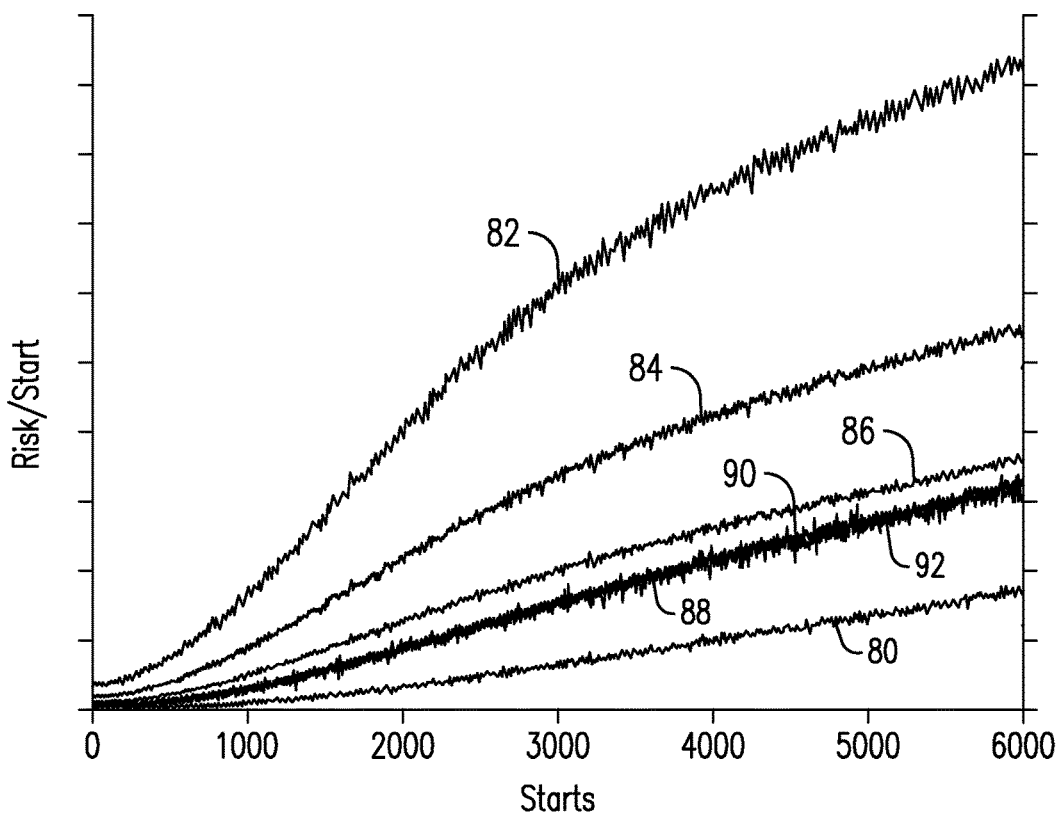
FIG. 8 illustrates results for a Monte Carlo theta integration embodiment of the invention as compared to a summation embodiment as described below.

FIG. 8 shows such a comparison for a component. The curves of FIG. 8 depict the relative risk of a failure per start as a function of the number of starts as follows:

Curve 80: applies the stress concentration factor from equation (1) for θ=0 degrees;

Curve 82: applies the stress concentration factor from equation (1) for θ=90 degrees;

Curve 84: applies the stress concentration factor from the first approach above for n=2 (equation (3));

Curve 86: same as curve 84 but for n=4;

Curve 88: same as curve 84 but for n=8;

Curve 90: same as curve 84 but for n=16;

Curve 92: applies the stress concentration factor from the Monte Carlo (second approach) technique described above.

Curves 88, 90 and 92 are substantially collinear and not easily distinguished in FIG. 8. This co-linearity property of FIG. 8 does illustrate that for n>4 the results based on equation (3) converge toward the results achieved with the MCTIA approach.

In lieu of using equations (1) and (2) above to find the stress increase near the bore hole, other information can be used to find the additional stress factor. Such other information might include a 3D finite element model, a sectional model, or a model that does not rely on the simplifying assumptions that are inherent in equations (1) and (2). For example, a model that does not require the infinitely-sized plate assumption or one that uses more realistic boundary conditions. Use of a different model would modify the stress ratios presented herein.

The present invention can also be used in different situations and in its different embodiments with differently-shaped components. If the component is 2D axially-symmetric then the stress value σ can be obtained from the 2D axis symmetric model. It is then necessary to write an equation that describes or parameterizes individual features of interest of that component, such as equations (1) and (2) above, to determine a stress concentration factor profile (tensor) σ based on the undisturbed stress (tensor) σ.

In the case of a multi-axial stress field, the presented equations can be applied for each component of the field. There may be cases where a stress concentration profile tensor has to be considered (for instance when multiple stress components are of similar size). However, the principle ideas of this invention are still applicable as described.

Although the present invention has been described with respect to a borehole in a gas turbine disc, the teachings of the invention can also be applied to other stress concentrating features, such as cooling holes, turbine blade grooves, cavities, and parametric boreholes with a non-linear centerline. The inventive approach can also be applied to probabilistic assessments for gas turbines used in the aeronautics and aerospace industries, steam turbines, generators, any other combustion device, rotating parts of trains and automobiles, etc. The inventive approach can also be used for probabilistic fracture mechanics assessment using the DARWIN tool.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method for analysis of 3D features of a curved component, subject to cyclical stresses, in a gas or combustion turbine, using a 2D probabilistic analysis, the method comprising:
    operating a system for evaluating the curved component subjected to a stress field, the system comprising a processor and an output device, the system being operated for:
    modeling the curved component comprising a stress concentrating feature;
    determining a circumferentially-dependent stress concentration profile around the stress concentrating feature;
    calculating a probability of failure of the curved component using a 2D probabilistic failure analysis of the stress concentration profile;
    performing a 2D probabilistic failure analysis for each of multiple angles around a circumference of the stress concentration profile;
    averaging results of the analyses to obtain a single probability of failure value of the curved component;
    outputting the probability of failure;
    controlling a downtime of the curved component based on an output generated by the system; and
    extending the service interval of the curved component, wherein a 3D stress field distribution of a 3d feature of the curved component or the curved component is mapped onto a 2D stress field.

2. The method of claim 1, further comprising performing the 2D probabilistic failure analysis using only a maximum stress concentration factor determined in the stress concentration profile.

3. The method of claim 1, further comprising calculating the probability of failure of the curved component using a Monte-Carlo theta integration approach.

4. The method of claim 1 wherein the stress concentrating feature comprises a borehole, and the probability of failure of the curved component is represented in a Monte-Carlos theta integration approach by a plurality of voxels $V_i$ for i=1, 2, . . . n, and a stress increase for each voxel near the borehole is determined by a uniformly distributed random variable angle $\theta_i = U(0,360)$ using the equation $$\sigma_i = \frac{\sigma}{2}\left[1 + \left(\frac{a}{r}\right)^2 - \left(1 + 3\left(\frac{a}{r}\right)^4\right)\cos 2\theta_i\right]$$

where $\theta_i = U(0,360)$ where σ is a stress value along an x axis according to a 2D axis-symmetric model, $\sigma_i$ is an increased stress at a distance r from the borehole, a is a borehole diameter, and θ is an angle measured from the x axis.

5. The method of claim 1, further comprising:
    identifying a plurality of voxels surrounding the stress concentrating feature;

randomly assigning a circumferential position value θ for each voxel, where θ is equally distributed over the range 0 to 360 degrees;

determining a stress field value for each voxel based on its respective circumferential position value θ;

aggregating all determined stress fields; and determining a probability of failure of the curved component responsive to the aggregated stress fields.

6. A method for analysis of 3D features of a curved component, subject to cyclical stresses, in a gas or combustion turbine, using a 2D probabilistic analysis, the method comprising:

operating a system for evaluating the curved component subjected to a stress field, the system comprising a processor and an output device, the system being operated for:

modeling the curved component comprising a stress concentrating feature;

determining a circumferentially-dependent stress concentration profile around the stress concentrating feature;

calculating a probability of failure of the curved component using a 2D probabilistic failure analysis of the stress concentration profile;

performing a 2D probabilistic failure analysis for each of a plurality of sectors around a circumference of the stress concentration profile; and averaging results obtained for the plurality of sectors to obtain a single probability of failure value of the curved component;

outputting the single probability of failure; and extending the service interval of the curved component, wherein a 3D stress field distribution of a 3d feature of the curved component or the curved component is mapped onto a 2D stress field.

7. The method of claim 6, wherein each sector circumscribes an angular arc, and wherein a single stress field value for use in a 2D probabilistic failure analysis for a respective sector is determined from the stress concentration profile at a midpoint of the angular arc of the respective sector.

8. The method of claim 6, wherein each sector circumscribes an angular arc, and wherein a single stress field value for use in a 2D probabilistic failure analysis for a respective sector is a maximum stress concentration factor of the stress concentration profile within the angular arc of the respective sector.

9. A method of analysis of 3D features of a curved component, subject to cyclical stresses, in a gas or combustion turbine, using a 2D probabilistic analysis, the method comprising:

operating a system for evaluating the component subjected to a stress field, the system comprising a processor and an output device, the system being operated for:

modeling the component including removing borehole material from a component model to represent a borehole;

determining a stress field in a region proximate the borehole; and executing a probability determining program to determine a probability of failure of the component after N cycles using stress field values as determined at the determining step;

outputting a probability of failure;

controlling a downtime of the component based on an output generated by the system, wherein the stress field is determined for a plurality of different values of θ according to $$\sigma_\theta = \frac{\sigma}{2}\left[1 + \left(\frac{a}{r}\right)^2 - \left(1 + 3\left(\frac{a}{r}\right)^4\right)\cos 2\theta\right]$$

where σ is the stress value according to a 2D axis-symmetric model, $\sigma_\theta$ is an increased stress at a distance r from a borehole center, a is a borehole diameter, and θ is an angle measured from an X axis, wherein the step of executing determines a probability of failure for the plurality of different θ values, and the probability of failure values are averaged for determining a probability of failure for the component, extending the service interval of the curved component, wherein a 3D stress field distribution of a 3d feature of the curved component or the curved component is mapped onto a 2D stress field.

10. The method of claim 9 wherein the stress field is determined for all values of θ according to $$\sigma_\theta = \frac{\sigma}{2}\left[1 + \left(\frac{a}{r}\right)^2 - \left(1 + 3\left(\frac{a}{r}\right)^4\right)\cos 2\theta\right]$$

where σ is a stress value according to a 2D axis-symmetric model, $\sigma_\theta$ is an increased stress at a distance r from a center of the borehole, a is a diameter of the borehole, and θ is an angle measured from an X axis and lies in the range from 0° to 360°.

11. The method of claim 10 wherein for calculated stress field values where $\sigma_\theta$ is less than the stress field values for σ, the stress field value for σ is used in the step of executing.

12. The method of claim 9 wherein the stress field is represented at all angular locations by a value obtained from $$\sigma_{90} = \sigma\left[1 + \frac{1}{2}\left(\frac{a}{r}\right)^2 + \frac{3}{2}\left(\frac{a}{r}\right)^4\right]$$

where σ is the stress value according to a 2D axis-symmetric model, $\sigma_{90}$ is an increased stress at a distance r from a borehole center, a is a borehole diameter.

13. The method of claim 9 further comprising a step of including correction values to a determined stress field.

14. The method of claim 9 wherein all stress field values within a region proximate the borehole are represented by a single stress field value.

15. The method of claim 9 wherein the borehole is represented by a plurality of pie-shaped sectors and the stress field values within each pie-shaped sector are represented by a single stress field value for that sector.

16. The method of claim 15 wherein each sector circumscribes a number of degrees and the single stress field value is determined at a θ value of one half an angular arc between two opposing edges of the pie-shaped sector.

* * * * *